United States Patent Office 3,829,490
Patented Aug. 13, 1974

3,829,490
CYCLOALKANEBIS(METHYLAMINE) ISOMERIZATION
Werner H. Mueller, Gulf Breeze, and Charles R. Campbell, Pensacola, Fla., assignors to Monsanto Company, St. Louis, Mo.
No Drawing. Filed Aug. 16, 1971, Ser. No. 172,246
Int. Cl. C07c 87/38
U.S. Cl. 260—563 D    8 Claims

ABSTRACT OF THE DISCLOSURE

The isomer ratio in a non-equilibrated mixture of the cis and trans isomers of a $C_6$–$C_{14}$ cycloalkanebis(methylamine) such as 1,4-cyclohexanebis(methylamine) can be conveniently altered by contacting the mixture at 175°–290° C. with hydrogen in the presence of a hydrogenation catalyst and ammonia. A high yield of one of such isomers can be obtained by similarly contacting a mixture of such isomers wherein the ratio of said one isomer to the other of said isomers is lower than the corresponding equilibrium ratio of such isomers, selectively separating said one isomer from the contacted mixture and recycling the residual mixture for more of such contacting.

BACKGROUND OF THE INVENTION

Cycloalkanebis(methylamine)s exist in either of two isomeric forms, the cis isomer in which the methylamine groups are pendant from the same side of the cycloalkane ring or the trans isomer in which the methylamine groups are situated on opposite sides of the ring. The structural distinction between such isomers may be illustrated as follows using, for example, the cis and trans isomers of 1,4-cyclohexanebis(methylamine):

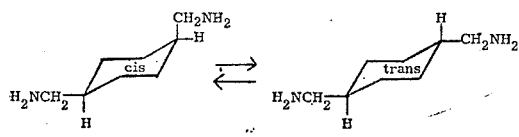

Differences in the relative proportions of the cis and trans isomers of cycloalkanebis(methylamine)s are generally reflected by important variations in the properties of polyamides prepared from monomers including such diamines. For example, polyamides prepared with high proportions of the trans isomer of a cyclohexanebis(methylamine) have generally higher melting and softening points than otherwise-similar polyamides prepared with greater proportions of the corresponding cis isomer. For most polyamide end uses, the properties obtained with high proportions of the trans isomer are more desirable. However, the polyamides high in cis isomer content have properties that may make them more suitable for other, less conventional polymer utilities.

In either case, the most desirable polyamide properties are usually obtained by use of a high (e.g. 80–100%) proportion of one of the two isomers. Unfortunately, commerically attractive processes for the production of cycloalkanebis(methylamine)s typically provide an isomer mixture that is not that rich in either the cis or trans isomer. Hence the need exists for a process whereby the cis: trans ratio of such isomers in a mixture thereof can be conveniently and rapidly altered.

With specific reference to cyclohexanebis(methylamine)s, William H. Seaton has disclosed a process for converting the cis or trans isomer to the other of said isomers in U.S. Pat. No. 3,344,164 which issued on Sept. 26, 1967. However, that process requires a strongly basic catalyst such as sodamide which presents formidable materials-handling problems and also normally results in loss of a substantial proportion of the cyclohexanebis(methylamine) by degradation during the isomerization process.

Processes for the isomerization of other alicyclic diamines are also known. For example, Wilfred J. Arthur has disclosed in U.S. Pat. No. 3,155,724 which issued on Nov. 3, 1964 that the relative concentrations of the three stereoisomers of bis(4-aminocyclohexyl)methane in a mixture thereof can be altered by subjecting the mixture to hydrogen in the presence of a ruthenium catalyst and ammonia. As shown hereinafter, that process is carried out by dehydrogenation and subsequent rehydrogenation of the cycloalkane ring substituents. However, that process is not analogous to the aforementioned isomerization of a cycloalkanebis(methylamine) because each of the two amine groups in a bis(4-aminocyclohexyl)-methane molecule is directly attached to a cyclohexane ring whereas each of the amine groups in a cycloalkanebis(methylamine) molecule is linked to the cycloalkane ring through a methylene radical.

More specifically, dehydrogenation of one isomer of bis(4-aminocyclohexyl)methane or any other diamine in which each of the two amine groups is directly attached to a cyclohexane ring forms an imine having a double bond between the pendent nitrogen atom and the ring carbon atom to which it is attached. Rehydrogenation of those atoms then forms in some cases the isomer previously dehydrogenated and in other cases a second isomer. Using 1,4-diaminocyclohexane for simplicity of illustration, the sequence of such reactions that result in formation of the second isomer may be represented as follows:

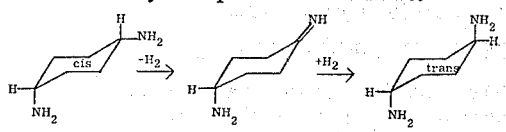

From the foregoing, those not skilled in the art might have expected that dehydrogenation-rehydrogenation conditions could be employed for isomerization of any other disubstituted cycloalkane in which each ring substituent contains a hydrogenated polyvalent atom (e.g. nitrogen or carbon) that is also directly attached to a carbon atom in the cycloalkane ring. However, that would not have been expected by those skilled in the art when the ring substituent contains a hydrogen-bearing functional group that is attached to the ring through an alkylene radical and more readily dehydrogenated than that alkylene radical. In those cases, a double bond resulting from dehydrogenation conditions would have been expected to be preferentially located between the functional and alkylene groups rather than between the alkylene group and the attached ring carbon atom. It will be apparent that with the double bond in the former (expected) position, isomerization of the cycloalkanebis(alkylamine) as described hereinbefore would not take place in any substantial proportion.

Expectations of that kind have been generally reinforced by experience in the art. For example, in U.S. Pat. No. 2,917,549 which issued on Dec. 15, 1959, Robert H. Hasek and M. B. Knowles have disclosed that mixtures of 1,4-cyclohexanedimethanol with high cis isomer content are isomerized to mixtures enhanced in the trans isomer only at an impractically slow rate by hydrogenation catalysts. Because an amino group, like a hydroxyl group, is more readily dehydrogenated than an alkylene group by which it is linked to a cycloalkane ring, it was believed that catalytic dehydrogenation-rehydrogenation conditions would be likewise ineffective for isomerization of a cycloalkanebis(alkylamine) at a commercially practical rate. Consistent with that belief, hydrogenation catalysts of the highest activity have been found to be substantially completely ineffective for the isomerization of 1,4-cyclohexanebis(ethylamine). However, the advantages of using a high proportion of the cis or trans isomer of a cycloalkanebis(methylamine) for various purposes, e.g. as mentioned hereinbefore, have made a commercially convenient process for the isomerization of the last-mentioned diamines very attractive and it is an object of this invention to provide such a process.

SUMMARY OF THE INVENTION

It has now been discovered that the cis:trans isomer ratio in a nonequilibrated mixture of the cis and trans isomers of a $C_6$-$C_{14}$ cycloalkanebis (methylamine) can be conveniently altered by contacting the mixture at a temperature between about 175° and about 290° C. with hydrogen having a partial pressure between about 10 and about 5000 p.s.i.a. in the presence of a hydrogenation catalyst and at least about 0.01 pound of ammonia per pound of said mixture. Particularly in continuous or semi-continuous operation, a high yield of one of such isomers can be obtained by a process which comprises contacting at such a temperature a mixture of the cis and trans isomers of a $C_6$-$C_{14}$ cycloalkanebis(methylamine) wherein the ratio of one of said isomers to the other of said isomers is substantially lower than the corresponding equilibrium ratio of said isomers at said temperature with hydrogen having a partial pressure between about 10 and about 5000 p.s.i.a. in the presence of a hydrogenation catalyst and at least about 0.01 pound of ammonia per pound of said mixture for a time sufficient to substantially alter the isomer ratio in the mixture, selectively separating said one isomer from the contacted mixture leaving a residual mixture wherein the ratio of said one isomer to the other of said isomers is substantially lower than said equilibrium ratio and recycling the residual mixture for more of said contacting.

DETAILED DESCRIPTION OF THE INVENTION

The cycloalkanebis(methylamine)s with which this invention is concerned are those containing from six to fourteen carbon atoms or, in other words, those having from four to twelve ring carbon atoms. Of particular but not exclusive interest are those having a ring containing an even number of carbon atoms (i.e., a cyclobutane, cyclohexane, cyclooctane, cyclodecane or cyclododecane ring) as well as those having no ring substitutents other than the requisite two methylamine groups. Also of particular interest are the cycloalkanebis(methylamine)s such as 1,4-cyclohexanebis(methylamine) and 1,6-cyclodecanebis(methylamine) that have maximum spacing between their two methylamine substituents but as used herein, the term "cycloalkanebis(methylamine)" should be understood to also include other diamines such as 1,3-cyclohexanebis(methylamine) that do not fall in that category. The $C_6$-$C_{14}$ cycloalkanebis(methylamine)s can be prepared by well-known procedures such as the catalytic hydrogenation of an unsaturated cyclic diamine (see, e.g., British Pat. No. 1,149,251 which issued to Columbian Carbon Company on Apr. 23, 1969) or the corresponding cycloalkanedicarbonitrile (see, e.g., U.S. Pat. No. 3,377,374 which issued to Chapman M. Hale, Jr., Vada L Brown, Jr. and Theodore E. Stannin on Apr. 9, 1968). Suitable cycloalkanedicarbonitriles can be prepared for such use by any convenient method such as dibromination of a corresponding cycloolefinic hydrocarbon followed by hydrogenation of the ring and then reaction of the dibrominated cycloalkane with sodium cyanide in the presence of copper cyanide (i.e., a Kolbe synthesis). The mixture of isomers with which the process of this invention is concerned may contain any other constituents (hydrocarbonaceous or otherwise) that do not interfere with the process so as to substantially completely prevent the desired isomer ratio alteration. However, it is generally most suitably carried out with the mixture consisting essentially of such isomers, e.g. a mixture containing no substantial amounts of other constituents that would be altered by the hydrogenation conditions employed.

The hydrogenation catalyst that are useful in the process of this invention include a variety of normally-solid substances well known to have hydrogenation activity in the conventional sense. Examples of such substances include the chemically uncombined metals of Group VIII of the Periodic Table of the Elements such as ruthenium, platinum, palladium, osmium, iridium and rhodium. Other examples of such substances include nickel or cobalt in the metallic or Raney catalyst form, ruthenium oxide, copper chromite, nickel sulfide, cobalt molybdate, nickel tungsten sulfide, tungsten disulfide, magnesium-activated copper, molybdenum sulfide and reduced oxides of nickel or cobalt. Chemically uncombined ruthenium is especially perferred. Platinum and palladium are also very effective.

In most cases, the ruthenium metal or other substance having hydrogenation activity is advantageously disposed on an inert solid support for use in the process of this invention. Suitable inert supports are described in Chapter 7 of *Catalysis* by S. Berkman, J. C. Morrell and G. Egloff, Reinhold Publishing Corp., New York (1940) and Chapter 6 of *Catalysis*, Volume 1 by P. H. Emmett, Reinhold Publishing Corp., New York (1954). Alumina is preferred as a support material although various other supports such as kieselguhr, barium sulfate, carbonaceous materials (e.g. charcoal, powdered carbon, etc.) or silica-alumina may be used. Suitable for practice of this invention are materials that comprise the substance having hydrogenation activity in an amount of from about 0.05% to about 20%, based on the total weight of the active component and support. Especially good results are available with the use of a contact material containing from about 1% to about 10% by weight of platinum or palladium on a powdered carbon support or ruthenium on an alumina support. When the last-mentioned material is used, it may be advantageously activated before use in this invention by washing with an alkali metal (e.g. potassium) hydroxide, e.g. as described in U.S. Pat. No. 3,471,563 which issued to Loren D. Brake on Oct. 7, 1969.

In the process of this invention, the hydrogenation catalyst is preferably situated in a fixed bed for contact with the isomer mixture which may be passed through the bed in either liquid or vapor phase. Otherwise, particles of the catalyst can be dispersed in the isomer mixture, e.g. by concurrent or countercurrent flow through a liquid or vaporous stream containing the isomers. In general, any method commonly used for contacting a solid hydrogenation catalyst with a liquid or vaporous material to be hydrogenated can be used in the process of this invention. The most desirable amount of catalyst for contact with a given isomer mixture depends on the manner and length of contact, the activity of the catalyst, the rate of isomerization desired, etc., but in general, the process can be carried out with any relative amount of catalyst that is effective in substantially altering the ratio of isomers in the contacted mixture. When the catalyst is a Group VIII metal such as ruthenium, for example, the process can be carried out with between about 0.001% and about 10% catalyst, based on the weight of the mixture of isomers contacted therewith. When the isomer mixture is to be contacted in the liquid phase, a suitable solvent such as water, excess ammonia, hexane, tetrahydrofuran, isopropanol, dioxane or cyclohexane may be used. When the isomer mixture is to be contacted in the vapor phase, the hydrogen and ammonia are generally sufficient diluent for the isomers. However, an additional diluent such as an inert gas (e.g. nitrogen) may be employed if desired. Selection of a solvent or additional diluent is usually not critical but in general, either would be inert to the isomers under the process conditions employed.

In accordance with the invention, contacting a mixture of the cis and trans isomers of a $C_6$-$C_{14}$ cycloalkanebis- (methylamine) with hydrogen in the presence of an effective amount of a hydrogenation catalyst as described hereinbefore at a fixed temperature between about 175° and about 290° C. drives the ratio of cis isomer to trans isomer in the mixture toward an equilibrium value. For example, equilibration of a mixture of the cis and trans isomers of 1,4-cyclohexanebis(methylamine) at approximately 240° C. eventually results in a mixture containing about 76.7% trans isomer and about 23.3% cis isomer. Hence the cis:trans ratio of the isomers in the equilibrated mixture is about 0.304. The same equilibrium ratio is ultimately reached regardless of the ratio of the isomers in the mixture prior to equilibration. The equilibrium cis:trans isomer ratios of the various $C_6$-$C_{14}$ cycloalkanebis(methylamine)s differ substantially but for a given pair of isomers, the ratio of the isomers in an equilibrated mixture thereof generally differs only slightly with the equilibration temperature employed.

In commercial operation, of course, it may be preferable to interrupt the contacting of the isomer mixture before equilibrium is reached. This would normally be desirable in a continuous process in which a substantially non-equilibrated mixture of the isomers is continuously fed into an isomerization zone and therein contacted with hydrogen in the presence of a hydrogenation catalyst and ammonia as aforesaid until the isomer ratio is altered substantially but not completely to its equilibrium value, the mixture of incompletely altered isomer ratio is continuously withdrawn from such contact, a substantial (generally major) proportion of the desired isomer is continuously separated (e.g. by conventional fractional distillation) from the withdrawn mixture and the residual mixture containing a greater-than-equilibrium ratio of the other of the isomers is continuously recycled for recontacting in the isomerization zone. Of course the residual mixture can be purified or otherwise treated as desired before being recycled and there are many different commercially-feasible process variations wherein one or more of the aforementioned steps would not be carried out continuously. In any of such processes, however, the separation of the desired isomer from the withdrawn mixture leaves a residual mixture in which the ratio of the other isomer to the desired isomer is substantially higher than the corresponding equilibrium ratio of the isomers. By recycling the residual mixture for further contacting in accordance with the process of this invention, still more of the other isomer therein can be converted to the desired isomer and ultimately, by carrying out the aforementioned steps repeatedly and preferably simultaneously, the other isomer can be converted to the desired isomer in very high proportion, i.e., from more than 80% up to 90% or 95% or, if desired, substantially completely.

For best results, the process is generally carried out with hydrogen having a partial pressure of at least about 10 p.s.i.a., preferably between about 10 and about 5000 p.s.i.a. and even more desirably between about 500 and about 5000 p.s.i.a. It is also generally advantageous to carry out the process in the presence of at least about 0.01 pound, and preferably between about 0.05 and about 10 pounds of ammonia per pound of the mixture of isomers.

As aforesaid, the process of this invention is normally carried out between about 175° C., below which the rate of equilibration may be insufficient for practical use of the process, and about 290° C., above which process heat requirements are disadvantageously high in most cases. The preferred temperature range is between about 180° and about 275° C., particularly for use with the isomers of a cyclohexanebis(methylamine). However, the choice of a specific contacting temperature will depend on other process variables such as the desirability of liquid-phase or vapor-phase operation, the particular catalyst to be used, the pressure and contact time desired, etc. Certain of these variables, including the optimum length of time for which the contacting of the isomer mixture is carried out, will depend in part on process features such as whether the contacting is to be carried out in batch or continuous operation, with a fixed or fluid catalyst bed, etc. Thus, in batch operation, the optimum contact time may be from about one minute up to an hour or longer whereas in continuous operation it may be on the order of a fraction (e.g. one-tenth) of a second up to about ten seconds or longer. In generic scope, the invention encompasses the use of any contact time sufficient to substantially alter the ratio of isomers in the contacted mixture. Other than as aforesaid, specific desired process conditions can be chosen and/or calculated by conventional process design techniques well known in the art.

The process of this invention may be better understood by reference to the following specific examples which are included for purposes of illustration only and do not imply any limitations of the scope of the invention. Percentages set forth in the examples are by weight unless noted otherwise.

Example I

A mixture composed of 20 grams of the cis and trans isomers of cyclohexanebis(methylamine) wherein the cis:trans isomer ratio was 2.92, 80 grams of ammonia and four grams of a solid particulate catalyst containing 5% by weight of ruthenium on an alumina support was pressurized to 1000 p.s.i.g. with hydrogen at 25° C. and then heated to 200° C., raising the pressure to 4500 p.s.i.g. After stirring of the mixture for 20 minutes, sample analysis by gas chromatography showed the cis:trans isomer had been lowered to 0.54 and loss of the diamine was less than one percent. After 40 minutes, a similar analysis showed the cis:trans isomer ratio had been further lowered to 0.41 and loss of the diamine had not exceeded two percent.

Example II

A mixture composed of ten grams of cyclohexanebis-(methylamine) wherein the cis:trans isomer ratio was 2.22, sixty grams of ammonia, 100 milliliters of tetrahydrofuran and ten grams of a solid particulate catalyst containing 5% by weight of platinum on a carbon support was pressurized to 500 p.s.i.g. with hydrogen at room temperature and then heated to 250° C. After thirty minutes, the cis:trans isomer ratio in the mixture had been lowered to 0.35.

Example III

A mixture composed essentially of ten grams of cyclohexanebis(methylamine) wherein the cis:trans isomer ratio was 1.27, sixty grams of ammonia, 50 milliliters of isopropanol and ten grams of Raney cobalt was pressurized to 200 p.s.i.g. with hydrogen at room temperature and then heated to 250° C. After sixty minutes of stirring, the cis:trans isomer ratio in the mixture had been lowered to 0.32.

Example IV

A mixture composed of ten grams of cyclohexanebis-(methylamine) wherein the cis:trans isomer ratio was 2.22, forty grams of ammonia, 50 milliliters of dioxane and five grams of a solid particulate catalyst contaning 10% by weight of palladium on a carbon support was pressurized to 200 p.s.i.g. with hydrogen at room temperature and then heated to 250° C. After sixty minutes, the cis:trans isomer ratio in the mixture had been lowered to 0.39.

Example V

Thirty grams of para-xylylenediamine dissolved in 300 milliliters of hexane were contacted with a 2000 p.s.i.g. atmosphere of hydrogen for ninety minutes at 110° C. in the presence of 120 grams of ammonia and 6 grams of a solid particulate catalyst containing 5% by weight of ruthenium on an alumina support. Sample analysis by gas chromatography showed that 91.5% of the aromatic diamine had been converted to the cis and trans isomers of cyclohexanebis(methylamine) and the cis:trans ratio of the isomers was 1.2. The pressure of the hydrogen atmosphere was lowered to 1050 p.s.i.g. and the temperature then raised to 200° C. for twenty minutes after which a similar sample analysis showed that no substantial loss of cyclohexanebis(methylamine) had taken place and the cis:trans ratio of the isomers thereof had been lowered to 0.39.

Example VI

When the procedure of Example V was repeated except that a like volume of tetrahydofuran was substituted for the hexane and the hydrogenation of the aromatic diamine was carried out in seventy minutes, the cis:trans isomer ratio was lowered from 1.08 to 0.37 without substantial loss of the saturated diamine.

We claim:

1. A process which comprises contacting at a temperature between about 175° and about 290° C. a mixture consisting essentially of the cis and trans isomers of a cyclohexanebis(methylamine) wherein the cis:trans isomer ratio is substantially different from the equilibrium cis:trans ratio of said isomers at said temperature with hydrogen having a partial pressure between about 10 and about 5000 p.s.i.a. in the presence of a ruthenium, palladium, platinum or Raney cobalt hydrogenation catalyst and at least about 0.01 pound of ammonia per pound of said mixture for a time sufficient to substantially alter the cis:trans isomer ratio in the mixture.

2. The process of Claim 1 wherein the cyclohexanebis(methylamine) is 1,4-cyclohexanebis(methylamine).

3. The process of Claim 1 wherein the mixture is in liquid phase.

4. A process which comprises contacting at a temperature between about 180° and about 275° C. a mixture consisting essentially of the cis and trans isomers of 1,4 - cyclohexanebis(methylamine) wherein the cis:trans isomer ratio is substantially greater than the equilibrium cis:trans ratio of said isomers at said temperature with hydrogen having a partial pressure between about 500 and about 5000 p.s.i.a. in the presence of a ruthenium hydrogenation catalyst and between about 0.05 and about 10 pounds of ammonia per pound of said mixture for a time sufficient to substantially lower the cis:trans isomer ratio in the mixture.

5. A process which comprises contacting at a temperature between about 175° and about 290° C. a mixture of the cis and trans isomers of a cyclohexanebis(methylamine) wherein the ratio of one of said isomers to the other of said isomers is substantially lower than the corresponding equilibrium ratio of said isomers at said temperature with hydrogen having a partial pressure between about 10 and about 5000 p.s.i.a. in the presence of a ruthenium, palladium, platinum or Raney cobalt hydrogenation catalyst and at least about 0.01 pound of ammonia per pound of said mixture for a time sufficient to substantially alter the isomer ratio in the mixture, selectively separating said one isomer from the contacted mixture leaving a residual mixture wherein the ratio of said one isomer to the other of said isomers is substantially lower than said equilibrium ratio and recycling the residual mixture for more of said contacting.

6. The process of Claim 5 wherein the cyclohexanebis(methylamine) is 1,4-cyclohexanebis(methylamine).

7. The process of Claim 5 wherein the contacting of the mixture is carried out with the mixture in liquid phase.

8. A process which comprises contacting at a temperature between about 180° and about 275° C. a mixture of the cis and trans isomers of 1,4-cyclohexanebis(methylamine) wherein the cis:trans isomer ratio is substantially greater than the equilibrium cis:trans ratio of said isomers with hydrogen having a partial pressure between about 500 and about 5000 p.s.i.a. in the presence of a ruthenium hydrogenation catalyst and between about 0.05 and about 10 pounds of ammonia per pound of the mixture for a time sufficient to substantially lower the cis:trans isomer ratio in the mixture, selectively separating trans-1,4-cyclohexanebis(methylamine) from the contacted mixture leaving a residual mixture wherein the cis:trans isomer ratio is substantially greater than said equilibrium ratio and recycling the residual mixture for more of said contacting.

References Cited

UNITED STATES PATENTS 3,657,345  4/1972  Brake _____ 260—563 D

LEWIS GOTTS, Primary Examiner

D. R. PHILLIPS, Assistant Examiner

U.S. Cl. X.R.

260—563 R, 464